(12) United States Patent
Lee

(10) Patent No.: US 6,886,911 B2
(45) Date of Patent: May 3, 2005

(54) APPARATUS FOR AND METHOD OF COMPENSATING FOR IMAGE QUALITY OF INKJET PRINTER

(75) Inventor: Seung-don Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 19 days.

(21) Appl. No.: 10/255,082

(22) Filed: Sep. 26, 2002

(65) Prior Publication Data

US 2003/0112292 A1 Jun. 19, 2003

(30) Foreign Application Priority Data

Dec. 19, 2001 (KR) .......................................... 2001-81123

(51) Int. Cl.$^7$ ............................. B41J 2/145; H04N 1/52
(52) U.S. Cl. ............................. 347/41; 347/15; 358/1.9; 358/534
(58) Field of Search ............................. 347/15, 41, 43, 347/14, 37; 358/1.2, 1.9, 534

(56) References Cited

U.S. PATENT DOCUMENTS

| | | | | | |
|---|---|---|---|---|---|
| 5,959,646 | A | * | 9/1999 | Bates et al. | 347/43 |
| 6,050,674 | A | * | 4/2000 | Hirabayashi et al. | 347/40 |
| 6,250,734 | B1 | * | 6/2001 | Otsuki | 347/16 |
| 6,375,307 | B1 | * | 4/2002 | Vinals et al. | 347/41 |
| 6,629,752 | B1 | * | 10/2003 | Mayo et al. | 347/41 |

* cited by examiner

*Primary Examiner*—Lamson Nguyen
(74) *Attorney, Agent, or Firm*—Staas & Halsey LLP

(57) ABSTRACT

A method of compensating for image quality of an inkjet printer includes selecting one of combinations of a plurality of shingling modes controlling shingling characteristics of image data and a plurality of printed data generating modes, which are set separately from the shingling modes, controlling other characteristics of image data except the shingling characteristics. Therefore, deterioration of the image quality due to a defective nozzle can be compensated without replacing an ink cartridge.

33 Claims, 5 Drawing Sheets

APPARATUS FOR AND METHOD OF COMPENSATING FOR IMAGE QUALITY OF INKJET PRINTER

CROSS-REFERENCE TO RELATED APPLICATIONS

This application claims the benefit of Korean Patent Application No. 2001-81123, filed Dec. 19, 2001, in the Korean Industrial Property Office, the disclosure of which is incorporated herein by reference.

BACKGROUND OF THE INVENTION

1. Field of the Invention

The present invention relates to a method of compensating for image quality of an inkjet printer, and more particularly, to an apparatus for and a method of compensating for image quality of an inkjet printer which can allow a user to select a level of shingling.

2. Description of the Related Art

An inkjet printer generally performs printing on paper by ejecting ink from thin nozzles of a printhead, and a spray mode (ink-jetting type) of the printhead of the inkjet printer is largely divided into a piezo-type and a thermal-type. In the thermal-type, ink is sprayed through nozzles by instantaneously applying heat to an ink chamber containing ink. In the piezo-type, ink is sprayed by a deformation to a piezo-actuator.

The inkjet printer includes a printhead spraying ink through nozzles irrespective of the ink-jetting type. The printhead has the nozzles to eject ink corresponding to each color of yellow (Y), magenta (M), cyan (C) and black (K) arranged in a sub-scanning direction, that is, in a paper feeding direction.

A printing process of a general inkjet printer is processed such that the printhead having nozzles for the respective colors prints a line on a sheet of paper while reciprocating in a main scanning direction perpendicular to the sub-scanning direction, and then the sheet moves (is fed) in the sub-scanning direction to allow the printhead to be disposed on a next line on the paper. As an example, printing is performed by the printhead with five nozzles arranged in the sub-scanning direction.

The general inkjet printer is provided with a plurality of nozzles, and a recent trend is toward providing a greater number of nozzles in order to improve the image quality. The image quality of the inkjet printer largely depends on a performance of the nozzles, and a deviation of a dot size or a dot position varying according to a difference in the performance of the nozzles results in a change in the image quality. In the general inkjet printer, as the printing is repeated, the nozzles deteriorate more severely, resulting in a considerable difference in the performance of the nozzles. Unlike a case as shown in FIG. 1 showing an ideal printing result, if there is any malfunctioning (defective) nozzle, the image quality of the inkjet printer is lowered as shown in FIG. 2A. Referring to FIG. 2A, a raster, that is, a row of dots ejected from a defective nozzle and printed in a group in the main scanning direction, is shown on a printed matter (sheet). If such rasters occur repeatedly, the image quality of the printed matter sharply deteriorates. The group of dots printed by a nozzle in the main scanning direction is referred to as the raster, and a line (image) may include a plurality of rasters (raster lines).

In order to prevent the image quality from deteriorating due to the defective nozzle, the printhead should be entirely replaced with a new one, which is, however, uneconomical. In particular, in a case where a printhead and an ink cartridge are incorporated with each other, it may often happen that a user has to either continue printing materials, which have lowered the image quality, or replace the ink cartridge before ink is fully consumed.

To compensate for the image quality lowered due to the defective nozzle, one approach to the lowered image quality is to program a printer driver of the inkjet printer to perform shingling. The term "shingling" refers to a method of controlling a printer in a software manner to provide temporal and spatial intervals necessary for drying a printed line prior to printing another image (line). That is to say, in a shingling mode, the printer prints a raster of the image only a predetermined percentage of total ink dots available in a given print pass with the defective nozzle and makes another pass to complete the raster with a normal nozzle, thereby preventing ink from draining, spreading, or forming a stain and to minimize a deviation in the performance between the nozzles.

FIG. 2B shows a result of printing by 50% shingling. With the 50% shingling as shown in FIG. 2B, a normal nozzle prints normal ink dots on a defective raster while alternately moving an odd-number raster row and an even-number raster row, which have not been printed properly, leading to good print quality.

As a shingling level increases, the percentage of the shingling is reduced. For example, 50% shingling is a higher level than 33% shingling, and 25% shingling is a higher level than 33% shingling.

FIG. 3 shows a printer driver system of the general inkjet printer, equipped with a control mode changing predetermined characteristics of image data from input image data to output image data.

Referring to FIG. 3, if the image data is input to a computer 11, a resolution, a color, a tone and a pixel position of the input image data are converted by a rendering module 13, a color converting module 15, a halftone module 17 and a shingle module 19, all contained in a printer driver 10, to the output image data to be output to a printer 21.

In the general inkjet printer, a shingling mode as well as a rendering converting mode, a color converting mode and a halftone module are previously set at a manufacturing time of the inkjet printer. Thus, in a case where an ink cartridge and a printhead are incorporated with each other, if any nozzle of the printhead is defective, there is no method of compensating for the image quality. Moreover, although the ink cartridge can be effectively used, both the defective printhead and the non-defective ink cartridge must be replaced with a new set to maintain the image quality.

SUMMARY OF THE INVENTION

To solve the above and other problems, it is an object of the present invention to provide an apparatus for and a method of compensating for image quality by allowing a user to select a shingling mode in a controller of an inkjet printer according to a degree of deterioration in a performance of nozzles.

Additional objects and advantageous of the invention will be set forth in part in the description which follows and, in part, will be obvious from the description, or may be learned by practice of the invention.

To accomplish the above and other objects of the present invention, there is provided a method of compensating for image quality of an inkjet printer by selecting one of combinations of a plurality of shingling modes to control shingling characteristics of image data and a plurality of printed data generating modes set separately from the shingling modes to control other characteristics of the image data except the shingling characteristics.

According to an aspect of the present invention, the shingling modes include low image quality, intermediate image quality and high image quality modes.

Here, the low image quality mode is preferably lower than the intermediate image quality mode, and the intermediate image quality mode is preferably lower than the high image quality mode in view of a level of shingling.

Also, the low image quality mode, the intermediate image quality mode and the high image quality mode are preferably set to have shingling levels of 50%, 33% and 25%, respectively.

The printed data generating modes may include at least one of rendering converting modes, color converting modes and halftone modes.

According to another aspect of the present invention, in a case where the image quality deteriorates due to some defective nozzles in the inkjet printer, a user can directly select a shingling mode compensating for the image quality. In particular, in a case where a printer head and an ink cartridge are incorporated with each other, since the image quality can be compensated without replacement of the printhead, it is not necessary to replace the ink cartridge, thereby performing cost-effective printing.

BRIEF DESCRIPTION OF THE DRAWINGS

These and other objects and advantageous of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
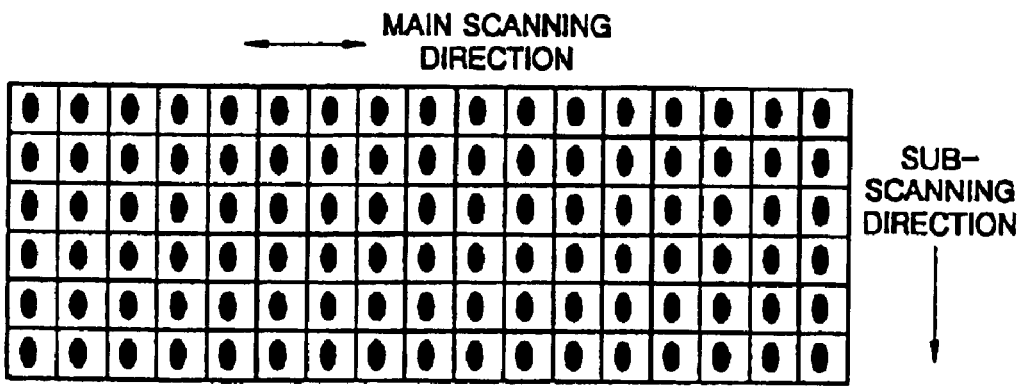
FIG. 1 shows a result of ideal printing by a conventional inkjet printer.
Figure 2A:
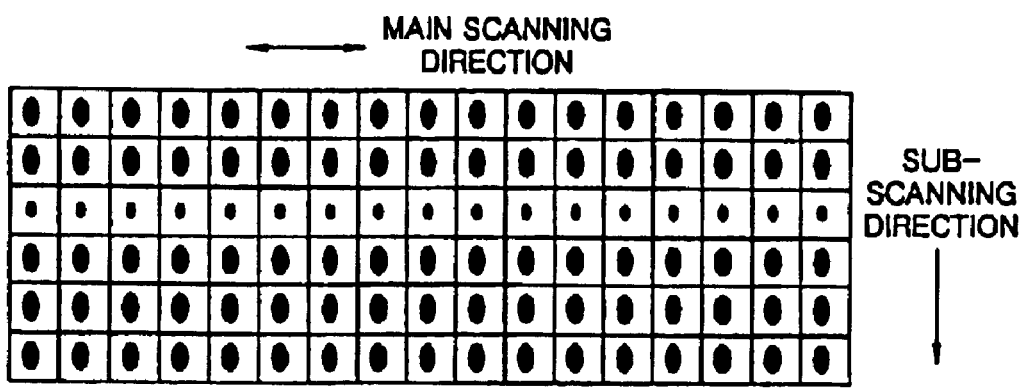
FIG. 2A shows another result of printing by the conventional inkjet printer with deteriorated nozzles, and FIG. 2B also shows another result of the printing with 50% shingling performed by the conventional inkjet printer.
Figure 2B:
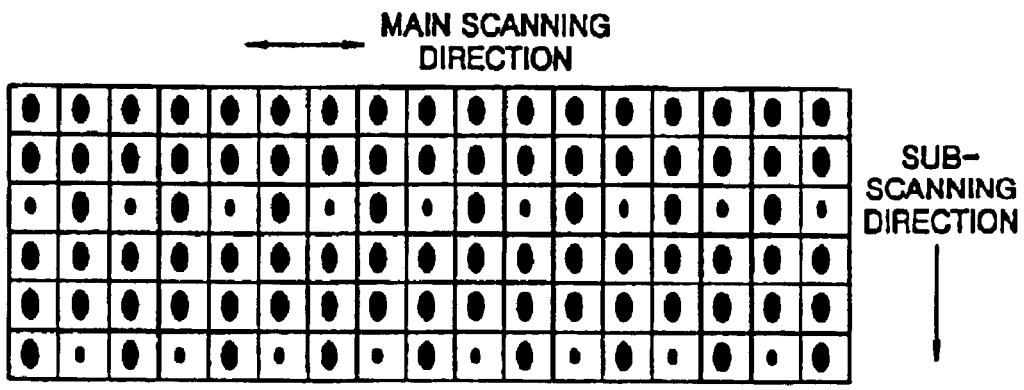
Figure 3:
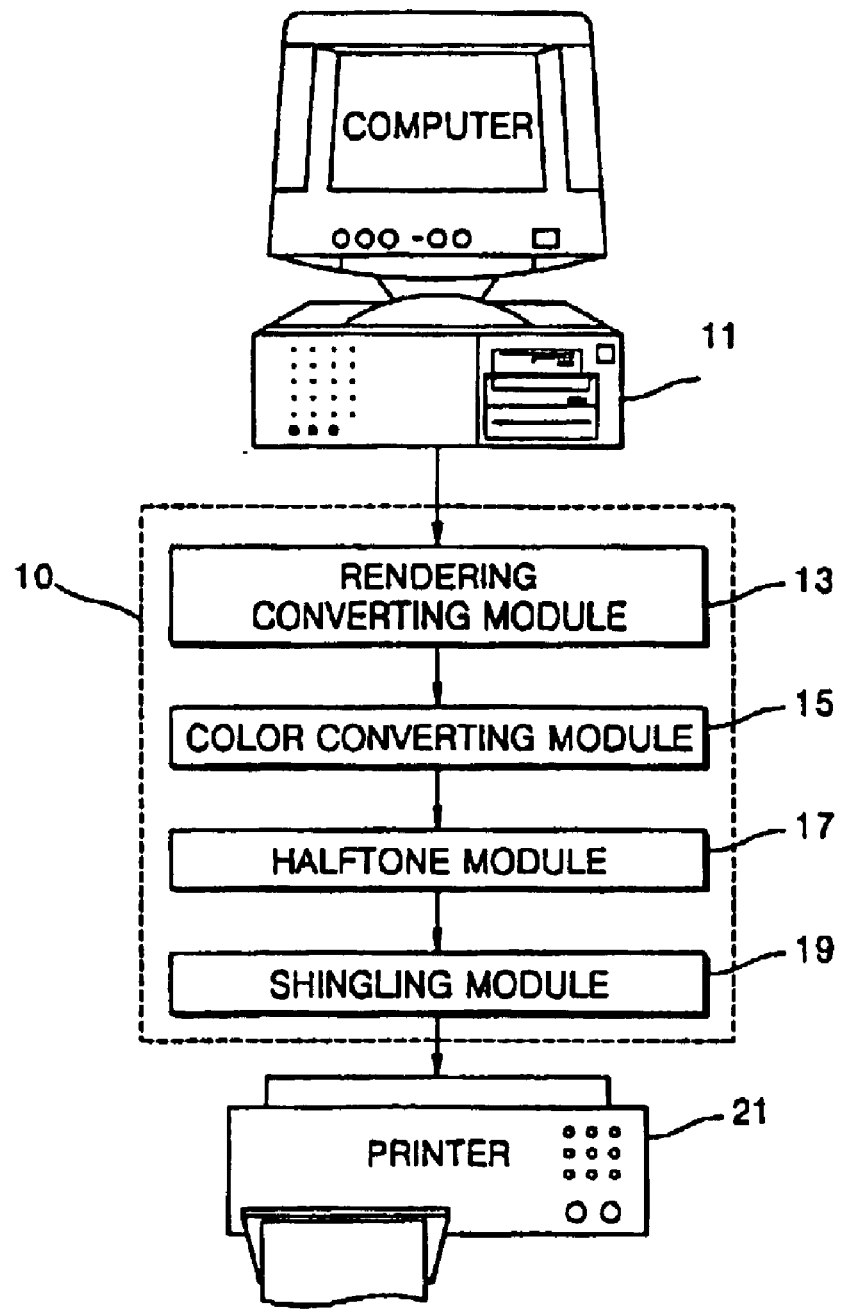
FIG. 3 is a schematic diagram of a conventional image quality compensating apparatus of the conventional inkjet printer.

Reference will now be made in detail to the present preferred embodiments of the present invention, examples of which are illustrated in the accompanying drawings, wherein like reference numerals refer to the like elements throughout. The embodiments are described in order to explain the present invention by referring to the figures.

Embodiments of a method of and an apparatus for compensating for image quality of an inkjet printer according to the present invention will now be described in detail with reference to the accompanying drawings.

Figure 4:
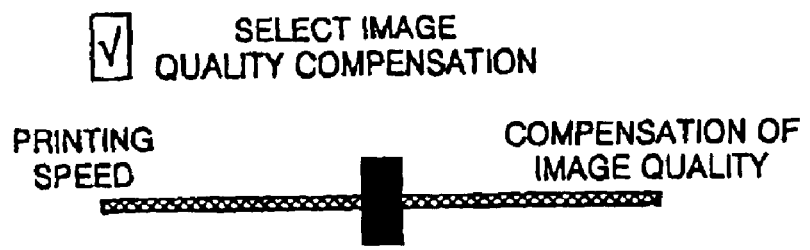
FIG. 4 shows an icon selecting a printing speed and compensation for image quality of a printer according to an embodiment of the present invention.
Figure 5:
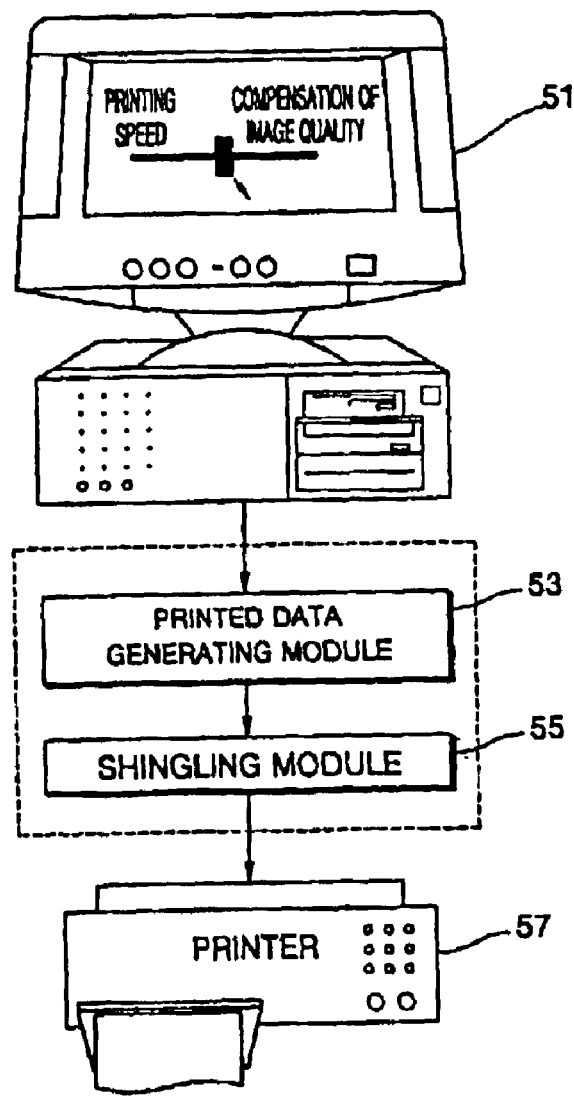
FIG. 5 is a schematic diagram showing an image forming apparatus for compensating for the image quality of the printer having the icon of FIG. 4.

FIG. 4 shows a control mode icon selecting a printing speed and compensation for image quality of a printer 51 of FIG. 5 according to an embodiment of the present invention. Referring FIG. 4, there is provided an apparatus for selecting the control mode icon, for example, for compensation for image quality by setting up a configuration of a printer driver of a computer 57 of FIG. 5 or the configuration of the printer 51 itself, and the control mode icon controlling compensation for image quality is selected by a slider control bar and a checkbox on a monitor of the computer 57 or the printer 51.

In general, as the image quality becomes higher, an overlapping percentage of shingling and the number of repetitions of printing dots in a main scanning direction are proportionally increased while a printing speed is inversely proportionally decreased. Considering that the printing speed is lowered as a level of the image quality which has been compensated through the control mode icon set by the user, the user may submit to a reduction of the printing speed in order to attain higher print quality by compensating for a deterioration of a nozzle. In this case, a level of shingling is increased when a slider control bar moves by the user to select a function of compensating for the image quality.

As shown in FIGS. 4 and 5, the shingling mode may be set so as to be continuously variable in the level of the shingling. Otherwise, modes for high image quality, intermediate image quality and low image quality can be separately selected. For example, the low image quality mode may be set to 50% shingle, the intermediate image quality mode may be set to 33% shingle. The percentage of shingling may be differently set from the above percentage.

If a compensation mode for the image quality is not selected, the level of shingling is determined by a default value set at a manufacturing time of the printer 57 or the computer 51. Thus, in a case where the user does not use the image quality compensation mode, a predetermined level of shingling is employed in the printer 57 or the computer 51.

FIG. 5 shows an image forming apparatus employing a method of compensating for the image quality of the printer 57. Referring FIG. 5, the apparatus includes a printed data generating module 53 having a rendering module, a color converting module and a halftone module, and a shingling module 55 which outputs control signals to control shingling modes through the icon of FIG. 4. The printed data generating module 53 and the shingling module 55 are separately set by a controller to transfer the corresponding control signals thereof to the printer 57 through different paths.

The user selects a predetermined printed data generating mode from the printed data generating module 53 depending on a predetermined number of possibilities of rendering converting modes, color converting modes and halftone modes, and also selects a shingling mode from the shingle module 55, so that the control signals are transferred to the printer 57 to perform printing.

Figure 6:
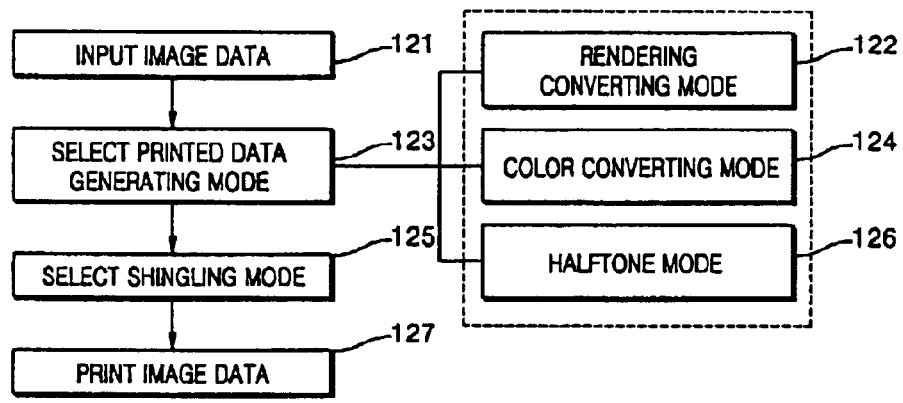
FIG. 6 shows a method of compensating for the image quality of the printer in the image forming apparatus of FIG. 5.

FIG. 6 shows the method of compensating for the image quality of the printer 57 in the image forming apparatus of FIG. 5. In the method of compensating for the image quality of the printer 57, a plurality of shingling modes controlling shingling characteristics of image data and a plurality of printed data generating modes controlling image characteristics other than the shingling characteristics, are separately or collectively controlled. Shingling is performed by selecting one of possible combinations of the plurality of the shingling modes and the plurality of the printed data generating modes.

Referring to FIG. 6, the method includes inputting image data in operation 121, selecting one of the printed data generating modes including a rendering converting mode 122, a color converting mode 124, and a halftone mode 126 in operation 123, selecting a specific level of shingling to compensate for the image quality of the selected printed data generating mode in operation 125, and outputting image data by transferring the control signals representing the specific level of shingling and the predetermined combination of the printed data generating modes to the printer 57 in operation 127.

Figure 7:
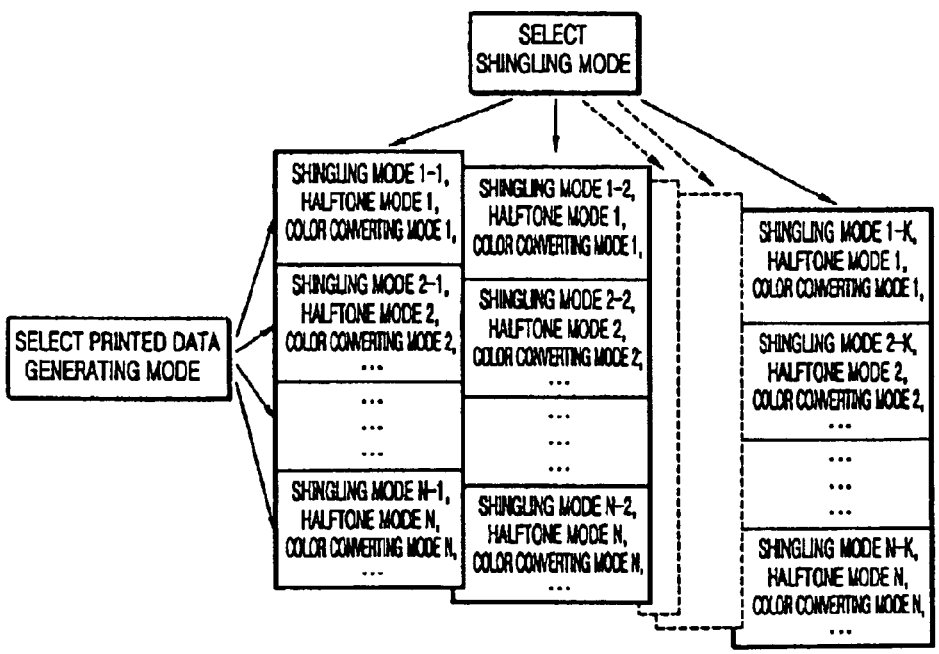
FIG. 7 shows various possible combinations of shingling modes and printed data generating modes of the printer in the image forming apparatus of FIG. 5.

FIG. 7 shows various possible combinations of the shingling modes and the printed data generating modes of the printer 57, for example, combinations of K shingling modes for N printed data generating modes. The printed data generating modes include one or more of rendering converting modes, color converting modes, and halftone modes, and combination methods of the respective modes are determined at the manufacturing time of the printer or the image forming apparatus of FIG. 5. That is, a printed data generating mode 1 includes a rendering converting mode 1, a color converting mode 1, and a halftone mode 1, and a printed data generating mode 2 includes a rendering converting mode 2, a color converting mode 2, and a halftone mode 2. However, a combination of the color converting mode 2 or the halftone mode 2 with the rendering converting mode 1 does not generate a new printed data generating mode.

Accordingly, as shown in FIG. 7, N printed data generating modes are combined with K shingling modes to form N×K combinations of printed data generating modes and shingling modes. A user can select one of K shingling modes with respect to one of N printed data generating modes to perform the compensation of the image quality.

Figure 8A:
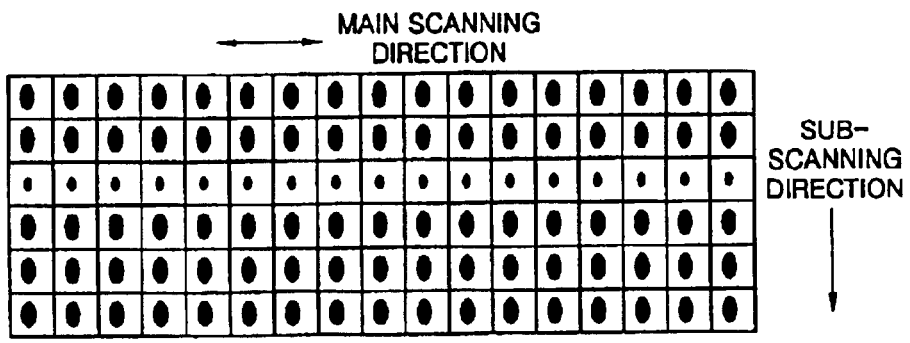
FIGS. 8A–8C show a result of printing without shingling, another result of printing in the case of selecting a 50% shingling mode, and another result of printing in case of selecting a 25% shingling mode in the image forming apparatus of FIG. 5, respectively.
Figure 8B:
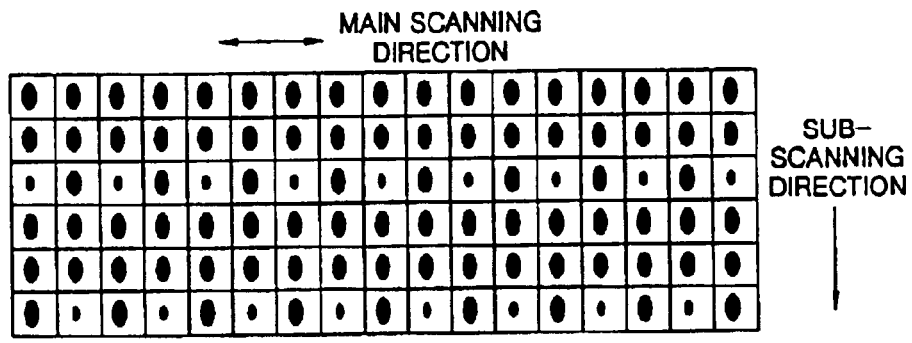
Figure 8C:
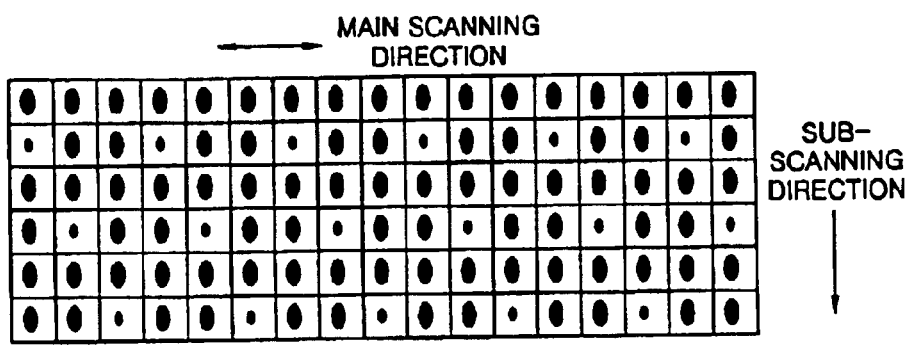

FIGS. 8A through 8C show the shingling performed by the apparatus for and method of compensating for the image quality in the printer 57. In detail, FIG. 8A shows a result of printing without shingling in a case where a third nozzle of a printhead, for example, is defective. Other results of the printing for a high image quality and an intermediate image quality are shown in FIGS. 8B and 8C, respectively.

In more detail, FIG. 8B shows the result of the printing in a case of selecting a low image quality mode with 50% shingling, and FIG. 8C shows the result of the printing in another case of selecting the intermediate image quality with 33% shingling.

Referring to FIG. 8B, the 50% shingling is processed such that the printhead performs printing the same raster twice on the paper in a main scanning direction with a normal nozzle, where the normal nozzle prints either an odd-number row block or an even-number row block on the raster printed by a defective nozzle. The paper moves by a predetermined distance in the sub-scanning direction so that the normal nozzle is disposed on a position corresponding to the raster printed by the defective nozzle to print one of the odd-number row block and the even-number row block of the raster.

As described above, with the 50% shingling, 100% printing is achieved by performing printing twice on the raster with the normal nozzle in the main scanning direction. After the printhead of the inkjet printer performs the printing twice in the main scanning direction, next printing is performed when the printhead passes a predetermined number of normal raster lines in the sub-scanning direction. The printhead may print all or each of the odd-number row block and the even-number row block of the raster with the normal nozzle.

Referring FIG. 8C, the 33% shingling is processed such that the printhead performs printing the same raster three times in the main scanning direction, where the normal nozzle normally prints two of three row blocks disposed on the raster printed by the defective nozzle. With 33% shingling, 100% printing is achieved by performing printing three times with the normal nozzle in the main scanning direction. After the printhead of the inkjet printer performs printing on the same raster three times in the main scanning direction, next printing is performed when the printhead passes a predetermined number of normal raster lines in the sub-scanning direction.

FIG. 8C shows that every defective raster is printed with the normal nozzle. As an example, two of every three row blocks in the main scanning direction, which three row blocks include a first row block, a second row block, and a third row block in the main scanning direction, are printed with the normal nozzle. On a second raster, the first row block and the third row block among every three row blocks are printed with the normal nozzle. On a fourth raster, the second row block and the third row block are printed with the normal nozzle. On a sixth raster, the first row block and the second row block are printed with the normal nozzle.

As described above, depending on the percentage of the shingling mode, one of a predetermined number of row blocks, for example one of every two row blocks, one of every three row blocks, or one of every four row blocks, disposed on the defective raster printed by the defective nozzle is printed with the normal nozzle. As an example, two of the row blocks disposed on the defective raster may be printed with the normal nozzle in response to the percentage of the shingle mode.

In the apparatus for and method of compensating for the image quality of the inkjet printer according to the present invention, a user can directly control an image quality compensating apparatus by using a shingling mode independently of other printed data generating modes of the conventional inkjet printer. In a case where the image quality deteriorates due to the defective nozzle, the image quality can be compensated by appropriately selecting the shingling mode independently of a rendering converting mode, a color converting mode and a halftone mode. The image quality can be compensated by simply changing the configuration of the printer driver or using a built-in program of the computer 51. Thus, a printer having an ink cartridge and a printhead incorporated therein is particularly cost-effective.

While the invention has been described with particular reference to various embodiments thereof, it may be construed that the foregoing description is only illustrative, rather than restrictive, of various preferred embodiments of the invention. For example, one skilled in the art will readily control an image quality control mode other than the shingling mode independently of printed data generating modes, within the spirit and scope of the invention.

As described above, the apparatus for and method of compensating for the image quality of an inkjet printer according to the present invention is advantageous in that it can compensate for the image quality economically by allowing the user to control the printer using the shingling mode independently of printed data generating modes, in the case where image quality is deteriorated due to a defective nozzle.

Although a few preferred embodiments of the present invention have been shown and described, it would be appreciated by those skilled in the art that changes may be made in this embodiment without departing from the principles and sprit of the invention, the scope of which is defined in the claims and their equivalents.

What is claimed is:

1. A method of compensating for image quality of an inkjet printer, the method comprising:

selecting one of combinations of a plurality of shingling modes controlling shingling characteristics of image data and a plurality of printed data generating modes, which are set separately from the shingling modes, and controlling other characteristics of the image data except the shingling characteristics.

2. The method of claim 1, wherein the shingling modes comprise low image quality, intermediate image quality and high image quality modes.

3. The method of claim 2, wherein the low image quality mode is lower than the intermediate image quality mode, and the intermediate image quality mode is lower than the high image quality mode in view of a level of shingling.

4. The method of claim 3, wherein the low image quality mode, the intermediate image quality mode and the high image quality mode are set to have shingling levels of 50%, 33% and 25%, respectively.

5. The method of claim 1, wherein the printed data generating modes include at least one of rendering converting modes, color converting modes, and halftone modes.

6. A method of compensating for image quality of an inkjet printer having a printhead and nozzles in an image forming system, the method comprising:

selecting one of combinations of a plurality of shingling modes to control a shingling characteristic of image data and a plurality of data generating modes, which are set separately from the shingling modes; and printing the image data on a sheet in accordance with the selected one of the shingling modes.

7. The method of claim 6, wherein the image forming system comprises a monitor, and wherein the selecting of the one of the shingling mode comprises displaying a control display on the monitor to allow a user to select the one of the shingling modes.

8. The method of claim 7, wherein the selecting of the one of the shingling modes comprises:

allowing the user to select a printing speed corresponding to the selected one of the shingling modes through the displayed control display; and printing the image data in accordance with the selected printing speed and the selected one of the shingling modes.

9. The method of claim 7, wherein the selecting of the one of the shingling modes comprises:

determining whether an image quality compensation mode is selected; and allowing the user to select the one of the shingling modes through the control display upon determining that the image quality compensation mode is selected.

10. The method of claim 7, wherein the selecting of the one of the shingling modes comprises:

changing an amount of shingling when the one of the shingling modes is selected.

11. The method of claim 7, wherein the control display comprises at least one of a slider control bar and a control mode icon.

12. The method of claim 7, wherein the system comprises a printer driver coupled to the inkjet printer, and the selecting of the one of the shingling mode comprises:

setting a configuration in the printer driver to control the monitor to display the control display in response to the configuration.

13. The method of claim 7, wherein the selecting of the one of the shingling modes comprises:

setting a configuration in the inkjet printer to control the monitor to display the control display in response to the configuration.

14. A method of compensating for image quality of an inkjet printer having a printhead and nozzles in an image forming system, the method comprising:

selecting one of a plurality of shingling modes to control a shingling characteristic of image data; and printing the image data on a sheet in accordance with the selected one of the shingling modes, wherein the selecting of the one of the shingling modes comprises:

selecting a printing speed corresponding to the selected one of the shingling modes; and printing the image data in response to one of the selected printing speed and the selected one of the shingling modes.

15. A method of compensating for image quality of an inkjet printer having a printhead and nozzles in an image forming system, the method comprising:

selecting one of a plurality of shingling modes to control a shingling characteristic of image data; and printing the image data on a sheet in accordance with the selected one of the shingling modes, wherein the printhead comprises a defective nozzle corresponding to a defective raster and a normal nozzle corresponding to a normal raster, and the printing of the image data comprises:

first printing a line having the defective raster and the normal raster on a sheet with the defective nozzle and the normal nozzle in a main scanning direction; and second printing a compensated raster on the defective raster of the sheet with the normal nozzle in the main scanning direction after the line is first printed in accordance with the selected one of the shingling modes before printing a next line with the defective nozzle and the normal nozzle of the printhead.

16. The method of claim 15, wherein the printing of the image data comprises:

moving the sheet in a sub-scanning direction perpendicular to the main scanning direction to locate the normal nozzle on a position corresponding to the defective raster.

17. The method of claim 15, wherein the defective raster comprises a plurality of groups each having a plurality of blocks in the main scanning direction, and the second printing of the compensated raster comprises:

printing a predetermined number of the blocks in every group with the normal nozzle in response to the selected one of the shingling modes.

18. The method of claim 17, wherein each group comprises two blocks, and the second printing of the compensated raster comprises:

printing one of the two blocks in every group with the normal nozzle in response to the selected one of the shingling modes.

19. The method of claim 18, wherein the two blocks are an odd numbered block and an even numbered block, respectively.

20. The method of claim 17, wherein the second printing of the compensated raster comprises:

third printing one of the two blocks in every group with the normal nozzle; and fourth printing the other one of the two blocks in every group with the normal nozzle.

21. The method of claim 17, wherein each group comprises three blocks, and the second printing of the compensated raster comprises:

printing two of the three blocks in every group with the normal nozzle in response to the selected one of the shingling modes.

22. The method of claim 21, wherein the three blocks are a first block, a second block, and a third block in the main scanning direction, and the two of the three blocks are one of a first combination of the first and second blocks, a second combination of the first and third blocks, and a third combination of the second and third blocks.

23. The method of claim 22, wherein the second printing of the compensated raster comprises:

selecting one of the first, second, and third combinations in every group of the defective raster in response to the selected one of the shingling modes.

24. The method of claim 21, wherein the second printing of the compensated raster comprises:

third printing a first one of the three blocks in every group with the normal nozzle;

fourth printing a second one of the three blocks in every group with the normal nozzle; and fifth printing a third one of the three blocks in every group with the normal nozzle.

25. A method of compensating for image quality of an inkjet printer having a printhead and nozzles in an image forming system, the method comprising:

selecting one of a plurality of shingling modes to control a shingling characteristic of image data; and printing the image data on a sheet In accordance with the selected one of the shingling modes, wherein the system further comprises a plurality of printed data generating modes other than the shingling modes, and the selecting of the one of the shingling mode and the printing of the image data comprise:

selecting one of the printed data generating modes corresponding to the selected one of the shingling modes; and printing the image data on the sheet in response to the selected one of the shingling modes and the selected one of the printed data generating modes.

26. The method of claim 25, wherein the image forming system comprises a computer coupled to the inkjet printer, and the selecting of the one of the printed data generating modes comprises:

transmitting the selected one of the shingling modes and the selected one of the printed data generating modes from the computer to the inkjet printer.

27. The method of claim 25, wherein the selected one of the shingling modes and the selected one of the printed data generating modes are independently transmitted from the computer to the inkjet printer.

28. The method of claim 25, wherein the system comprises a shingling module and a printing data generating module both coupled to the inkjet printer, and selecting of the one of the printed data generating modes comprises:

transmitting the selected one of the shingling modes from the shingling module to the inkjet printer using a first transmission line and the selected one of the printed data generating modes from the printing data generating module to the inkjet printer using a second line different from the first transmission line.

29. An apparatus for compensating for an image quality in an inkjet printer, comprising:

a selecting module selecting one of combinations of a plurality of shingling modes to control a shingling characteristic of image data and one of a plurality of data generating modes, which are separately set from the shingling modes; and a printhead printing the image data on a sheet in accordance with the selected one of the shingling modes.

30. The apparatus of claim 29, wherein the printhead prints the image data on the sheet in accordance with the selected one of the shingling modes and the selected one of the printed data generating modes.

31. The apparatus of claim 30, wherein the printed data generating modes comprises rendering converting modes, color converting modes, and halftone modes, and the printed data generating module selects one of the rendering converting modes, one of the color converting modes, and one of the halftone modes.

32. The apparatus of claim 29, wherein the inkjet printer comprises a monitor, and the shingling module displays a control display on the monitor to allow a user to select one of the shingling modes.

33. An apparatus for compensating for an image quality in an inkjet printer, comprising:

a shingling module selecting one of a plurality of shingling modes to control a shingling characteristic of image data; and a printhead printing the image data on a sheet in accordance with the selected one of the shingling modes, wherein the printhead comprises a normal nozzle and a defective nozzle corresponding to a normal raster and a defective raster, respectively, and the printhead first prints a line having the normal raster and the defective raster and second prints a compensated raster on the detective raster of the sheet with the normal nozzle in response to the selected one of the shingling modes before printing a next line.

* * * * *

UNITED STATES PATENT AND TRADEMARK OFFICE
CERTIFICATE OF CORRECTION

PATENT NO. : 6,886,911 B2 Page 1 of 1
DATED : May 3, 2005
INVENTOR(S) : Lee

It is certified that error appears in the above-identified patent and that said Letters Patent is hereby corrected as shown below:

Column 9,
Line 43, change "In" to -- in --.

Signed and Sealed this

Twenty-seventh Day of December, 2005

JON W. DUDAS
*Director of the United States Patent and Trademark Office*